(12) United States Patent
Pietra et al.

(10) Patent No.: US 12,505,442 B2
(45) Date of Patent: Dec. 23, 2025

(54) SYSTEMS AND METHODS FOR CONTACTLESS BILLING AND PAYMENT

(71) Applicant: QORUM, INC., Los Angeles, CA (US)

(72) Inventors: Andrew Pietra, Los Angeles, CA (US); Nicholas Ikaika Cadiente, Kailua, HI (US)

(73) Assignee: QORUM, INC., Los Angeles, CA (US)

(*) Notice: Subject to any disclaimer, the term of this patent is extended or adjusted under 35 U.S.C. 154(b) by 357 days.

(21) Appl. No.: 17/746,744

(22) Filed: May 17, 2022

(65) Prior Publication Data

US 2022/0374897 A1    Nov. 24, 2022

Related U.S. Application Data

(60) Provisional application No. 63/192,440, filed on May 24, 2021.

(51) Int. Cl.
| | |
|---|---|
| G06Q 20/40 | (2012.01) |
| G06Q 20/04 | (2012.01) |
| G06Q 20/10 | (2012.01) |
| G06Q 20/32 | (2012.01) |
| G06Q 20/36 | (2012.01) |
| G06Q 20/38 | (2012.01) |

(52) U.S. Cl.
CPC ..... *G06Q 20/4014* (2013.01); *G06Q 20/0425* (2013.01); *G06Q 20/102* (2013.01); *G06Q 20/327* (2013.01); *G06Q 20/3674* (2013.01); *G06Q 20/3829* (2013.01); *G06Q 2220/00* (2013.01)

(58) Field of Classification Search
None
See application file for complete search history.

(56) References Cited

U.S. PATENT DOCUMENTS

| 2018/0247283 A1* | 8/2018 | Milici | G06Q 20/327 |
| 2018/0293562 A1* | 10/2018 | Squire | G06Q 30/0238 |
| 2020/0320503 A1* | 10/2020 | Mell | G06Q 20/204 |
| 2020/0387887 A1* | 12/2020 | Rathod | G06Q 20/3224 |

FOREIGN PATENT DOCUMENTS

WO    WO-2022074416 A1 *  4/2022  ......... G06Q 30/0631

OTHER PUBLICATIONS

Saeed, H., et al., "Near-field communication sensors and cloud-based smart restaurant management system", 2016 IEEE 3rd World Forum on Internet of Things (WF-IoT) (2016, pp. 686-691) (Year: 2016).*

* cited by examiner

*Primary Examiner* — Clay C Lee
(74) *Attorney, Agent, or Firm* — FINNEGAN, HENDERSON, FARABOW, GARRETT & DUNNER, LLP

(57) ABSTRACT

Systems and methods for contactless payment are disclosed. The system and methods may include performing steps of: receiving user information from a user device, the user information including at least authentication information and payment information; receiving check information from a venue, the check information including at least a check identifier and initial order information; generating a check identifier for wirelessly communicating the check information to the user device; displaying the check identifier on a display on the user device; receiving a check close command; and requesting a payment from a user based on the user information and check information.

22 Claims, 8 Drawing Sheets

SYSTEMS AND METHODS FOR CONTACTLESS BILLING AND PAYMENT

RELATED APPLICATION

This application claims the benefit of priority to U.S. provisional Application No. 63/192,440, filed May 24, 2021, which is incorporated herein by reference in its entirety.

TECHNICAL FIELD

The present disclosure generally relates to computerized systems and methods for cashless and touchless transactions at restaurants, bars, festivals, airplanes, and similar establishments.

BACKGROUND

In a restaurant or bar, customers are typically presented with a bill at the conclusion of service, whereafter they present the venue staff (i.e., a waiter, bartender, or the like) with a credit card. The credit card is taken from the customer, run through a point-of-service sales machine, and returned to the customer with a printed receipt upon which the customer may add a gratuity. Some credit cards may not be EMV (Europay, Mastercard, and Visa) compliant cards and are "swiped" at a terminal to read payment information, rather than being "dipped" or "tapped." Such swipe-style payments are known to be less secure and prone to fraud.

The traditional process also does not offer the customer much control over their bill. Records of the foods or services they ordered are kept at a remote POS or even a notepad, and are presented to the customer only at the conclusion of service. The customer can dispute an mistaken item only then, or more often than not, the customer may not notice the mistaken item until after they have left the venue.

The traditional process presents problems to the venue as well. The venue has no way to verify that a customer will be able to pay for the services they receive until payment instruments (e.g., debit or credit cards) are presented at the conclusion of service. The venue is left without any means to collect payment if it turns out the customer is unable to pay (e.g., forgot their wallet, card declined, etc.). Other options to recoup payment are available, such as relying on the customer's promise or submitting to a collection agency, but such processes are costly and/or time consuming with no guarantee for eventual payment.

Therefore, there is a need for improved methods and systems for more transparency and control over transactions.

SUMMARY

One aspect of the present disclosure is directed to a system for contactless payment. The system may comprise at least one processor; and at least one memory storing instructions that, when executed by the at least one processor, cause the system to perform operations. The operations may comprise: receiving user information from a user device, the user information including at least authentication information and payment information; receiving check information from a venue, the check information including at least a check identifier and initial order information; generating a check identifier for wirelessly communicating the check information to the user device; displaying the check identifier on a display on the user device; receiving a check close command; and requesting a payment from a user based on the user information and check information.

Another aspect of the present disclosure is directed to a system for express payment triggered by customer activity. The system may comprise: at least one processor; and at least one memory storing instructions that, when executed by the at least one processor, cause the system to perform operations. The operations may comprise: receiving payment information from a customer upon arrival at a venue; generating customer context data about the customer; obtaining a preauthorization request for a spending allowance determined based on the customer context data; generating a check data with the spending allowance, wherein the check data is configured to update based on the customer's activity at the venue; and finalizing the check data.

Yet another aspect of the present disclosure is directed to a wearable device for contactless payment. The wearable device may comprise: an enclosure configured to be positioned on a customer; at least one processor; a wireless transceiver coupled to the at least one processor; and at least one memory storing instructions that, when executed by the at least one processor, cause the at least one processor to perform operations. The operations may comprise: storing a virtual financial account holding a currency balance; establishing a first short-term secured channel using the wireless transceiver to a customer device for managing the virtual financial account; establishing a second short-term secured channel using the wireless transceiver to an on-premise beacon for recording location of the customer; and establishing a third short-term secured channel using the wireless transceiver to a transaction authenticator for making one or more charges against the virtual financial account.

Other systems, methods, and computer-readable media are also discussed herein.

For example, in one embodiment, a customer can pay a restaurant check with a typical credit card, but instead of the credit card being taken to a remote POS, the payment may be processed via a handheld mobile payment device running an application such as the Outpay Venue App.

In another embodiment, a customer may open a tab at a venue using a credit card but close the tab via a handheld mobile payment device running an application such as the Outpay Venue App. After the tab has been opened, but before it has been closed, the customer can optionally view check information on a personal mobile device or on a venue handheld such as the handheld mobile payment device. This tab can be closed by the customer's personal mobile device, via the venue's handheld mobile payment device, or automatically after a preset time of inactivity without the customer having to again present the payment method, such as if the customer otherwise forgets to close the tab. The handheld mobile payment device may be used at a central location in the venue, or tableside, and may include Wi-Fi communication functionality for secure transmission of credit card information. Alternatively or additionally, the handheld mobile payment device may have cellular communication functionality as a communication method for secure credit card information.

In another embodiment, a customer may pay for a cover charge via a handheld mobile payment device running an application such as the Outpay Venue App that accesses predetermined cover charges stored in a remote service. An exemplary handheld mobile payment device is disclosed in U.S. Provisional Application No. 63/269,155, filed on Mar. 10, 2022, which is incorporated herein by reference in its entirety.

In another embodiment, a customer may pay for items from a limited menu such as at a music festival using a handheld mobile payment device running an application such as the Outpay Venue App. Due to the possibility of connection issues, payment information can be stored locally for later transmission to a remote payment processor. In this embodiment, when payment is taken for a cover charge, the taking of payments via the handheld mobile payment device permits the payments to immediately post to the venue's point of sales system.

DETAILED DESCRIPTION

Figure 1:
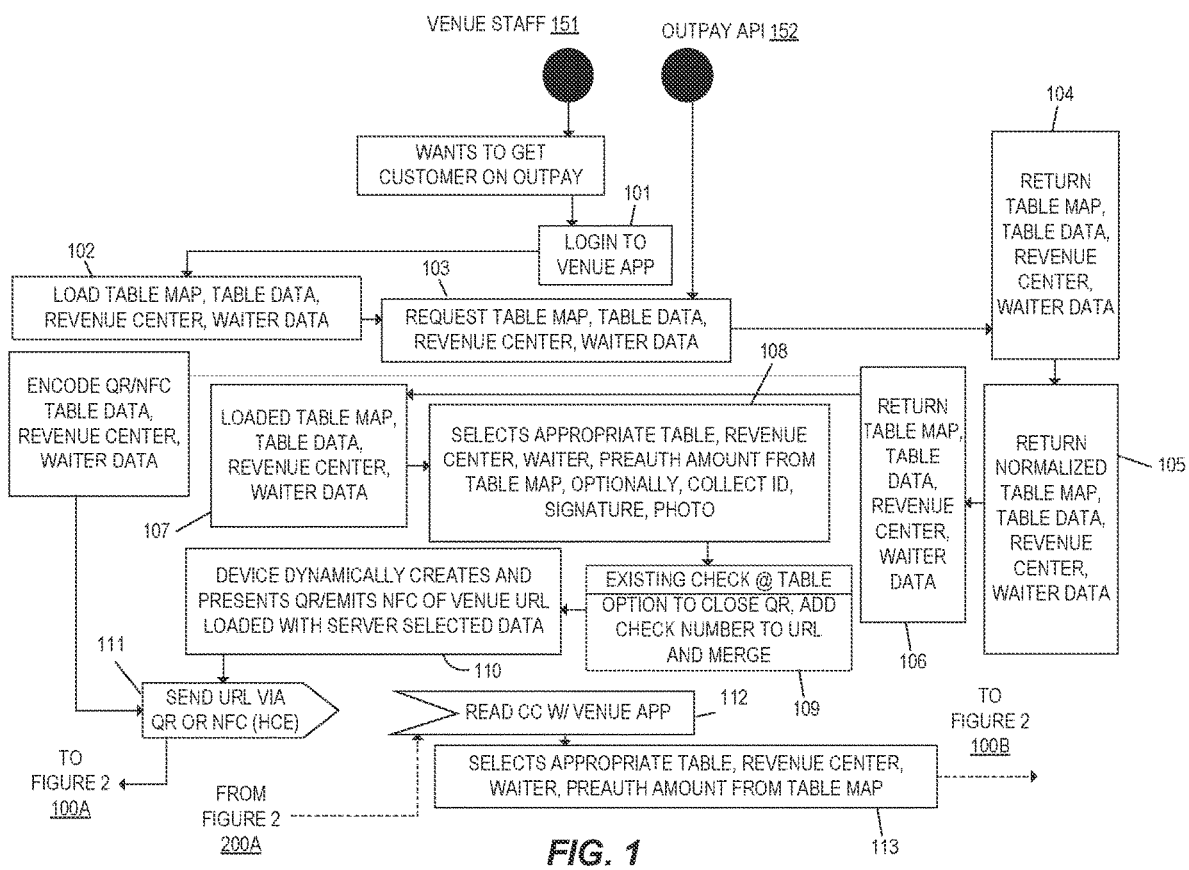
FIG. 1 is flowchart of an exemplary computerized process for fetching data and preparing for contactless payment at a services venue, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 depicts a main loop 100 for fetching data and preparing for contactless payment at a services venue. At step 101, venue staff 151 working at the venue that wish to have customers pay via a contactless billing and payment system (hereinafter "Outpay") first log in to the venue's application(s) to load venue data at step 102, which may include one or more table maps, table data, a revenue center, and/or staff data such as data associated with a waiter at a restaurant. At step 103, an Outpay Application Programming Interface (API) 152 requests the venue data from the venue application(s), which is forwarded to an Outpay Point of Sale (POS) service (not shown) and to a POS server. At step 104, POS server returns venue data to the Outpay POS service, which is normalized at step 105 and returned to Outpay API 152 at step 105. The POS server may comprise a remote server accessible via cloud or a local server located on the premises of the venue.

In some embodiments, at step 106, the Outpay API 152 sends venue data to an Outpay venue app (not shown) on a venue-owned device (not shown). The venue app receives the venue data at step 107 and selects one or more of an appropriate table, revenue center, staff, or preauthorized billing amount based on the venue data at step 108. In some embodiments, venue staff may request, either manually or via the venue device, customer data. Customer data may include, for example, a customer's identification card or documents, signature, and/or photograph. In some embodiments, customer data may also include tracking data and/or temporary data. For example, health and tracking data facilitating contract tracing may be requested to ensure compliance with public health policies and subsequently deleted after a predetermined time to maintain customer privacy.

The venue devices and venue apps are configured for optimal compatibility and performance across a variety of use cases. As such, the venue devices and apps may be agnostic to any particular POS software, service, or system and agnostic to an operating system. The venue apps may also be configured to be agnostic to device type. For example, the venue app may be provided on a tablet, smartphone, or computer to ensure venue access to Outpay is possible across many venue types and sizes. In addition, Outpay may be accessible via a native app installed on the venue device or via a web-based app.

In some embodiments, at step 109, a check for one or more customers has already been opened outside of the Outpay system prior to loading venue data in the Outpay venue app. The venue staff may choose whether to close the previously opened check, or to add and merge the prior check to a new Outpay check. At step 110, the Outpay venue app dynamically creates an electronic check identifier which contains URL data, the URL comprising the data selected by the venue app based on venue data from the Outpay API 152. The electronic check identifier may comprise one or more of a Quick Response (QR) code, Near-Field Communication (NFC) (including passive, peer-to-peer, and Host Card Emulation), Radio-Frequency Identification (RFID), Bluetooth, Bluetooth LE, Wi-Fi, or other wireless communication means. It will be readily understood that other wireless communication means described throughout this disclosure may also include one or more of the above-listed communication means. The electronic check identifier is displayed and/or presented on the venue device. In some embodiments the electronic check identifier is static, and dynamic data is used on the backend to associate a check with unique check data. For example, check data may include a check creation time that uniquely identifies a check because checks are not created simultaneously.

At step 111, the electronic check identifier displayed and/or presented by the venue device is sent to an Outpay app installed on a customer device, such as a customer's smartphone, smartwatch, or other smart device. In some embodiments where the customer is not already registered with Outpay or does not wish to use the Outpay app, the customer may provide customer payment data (e.g., credit card, debit card, digital wallet data, or other digital financial service) for acceptance by the venue at step 112. At step 113, the venue and/or its staff may then select an appropriate table, revenue center, staff, and preauthorized billing amount using the table map and data from the Outpay app.

In some embodiments the venue data is encoded and stored in a dynamically created electronic check identifier on the Outpay app installed on the customer device.

In some embodiments the system may also include a pre-seating and/or waitlist function to assist venue staff 151 with organizing and processing customers. First, customers may be directed to the system via a passive wireless link, such as a link provided via a QR code or NFC or connections to one or more Bluetooth beacons at the venue at step 111. Alternatively, venue staff 151 may provide direct access to the system via a venue device. The customer may then input customer information into the system, which may include one or more of user login credentials, account information, contact information, party size, and notification preferences, including notification preferences. Information input by the customer may be stored in a database by the Outpay API 152 for future reference when a check is opened. Next, the system may notify the customer that a space at the venue is available for the customer and/or the customer's party. The system may determine that space at the venue is available automatically based on current seating capacity, occupancy, and check payment statuses, or via manual host input. The system may notify the customer via varying means depending on the customer information. For example, if the customer enabled notification preferences indicating a text/SMS message should be sent, the system may send an automated or venue-customized text/SMS message to a cell phone number input by the customer in the system. In some embodiments, the customer may have the Outpay app installed on a smartphone and receive a push notification. In some embodiments, the notification may be sent based on default venue or system settings. The customer may respond to the notification in various ways depending on the form of notification received, or the customer may respond by physically appearing at the venue. Venue staff 151 may then use Outpay to open a check for the customer and/or the customer's party, assign a venue space, and proceed to receive, process, and bill for customer orders as further detailed herein.

In some embodiments, the system may also include an at-seat check opening function whereby a customer who is already seated or assigned to venue space may open a check. A passive wireless link or venue device may be provided to one or more customers upon their arrival at their assigned seat or venue space. By allowing a check to be opened using both a pre-seating and at-seat check opening function, the system may be able to perform optimally in varying venue circumstances, including peak traffic circumstances where waitlist becomes desirable, and off-peak traffic circumstances when providing the at-seat check opening function is more efficient than requiring a waitlist where one is not needed.

In some embodiments, a check may be opened and the venue staff 151 may begin one or more services for the customer upon manual input from one or more members of venue staff. For example, a server at the venue may input relevant table, seating, or customer information into the Outpay app via a venue device and present the device to the customer(s) so that they may open one or more checks. In some embodiments, venue staff may instead provide the venue device to one or more customers after one or more services and/or checks have already been started and/or opened, or the one or more customers may be presented with an electronic check identifier provided at the customer's assigned venue space. Using the venue device or the electronic check identifier, the customer may be then presented with options to accept and pay for one or more checks or one or more billing items within the one or more checks. In some embodiments, venue staff 151 may provide a venue device to one or more customers at the end of a service. Venue staff 151 may input check information that may be fetched and displayed to a customer via Outpay upon use of the electronic check identifier. The customer may pay the check in full or one or more customers may split the check via the Outpay app.

Figure 2:
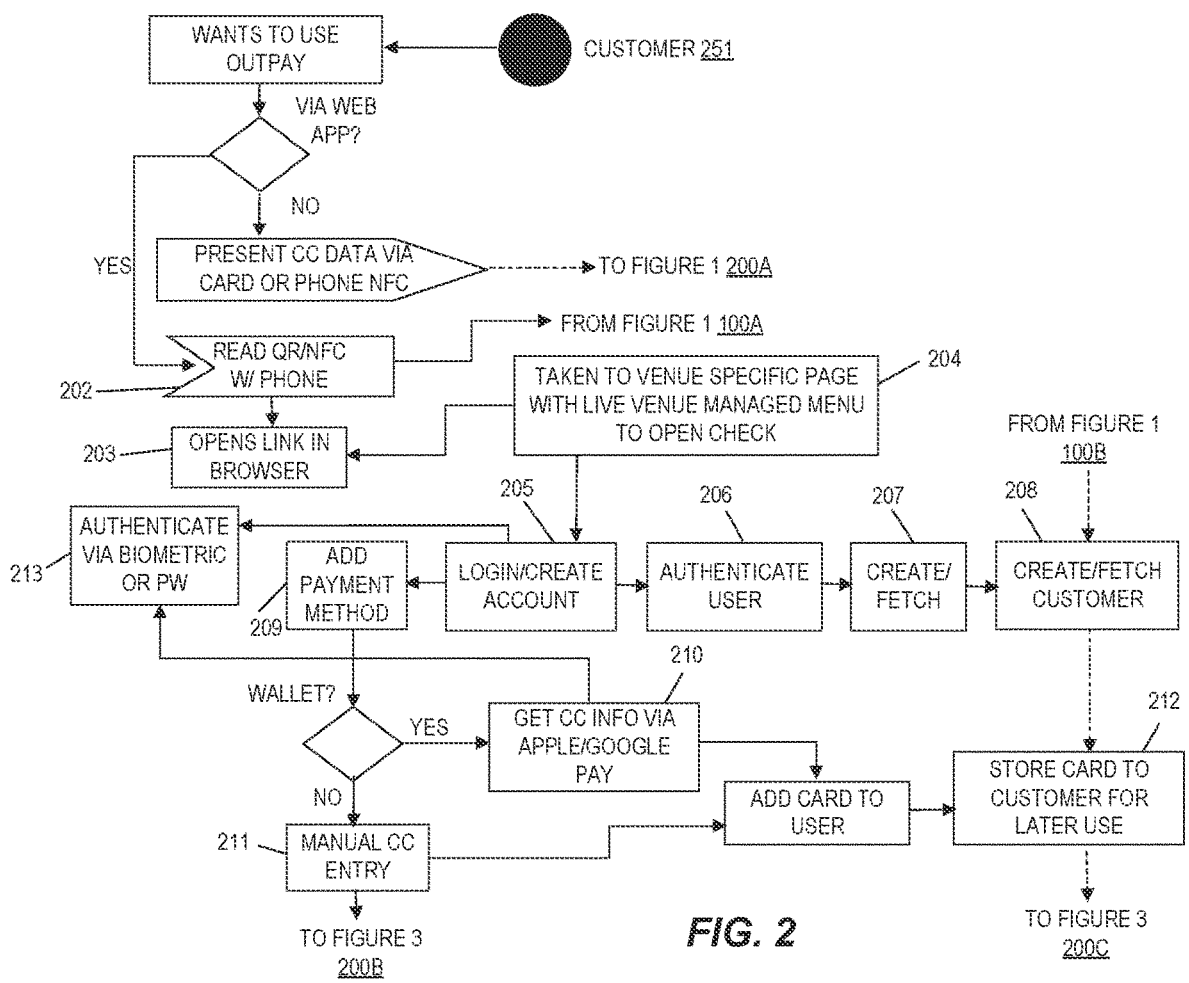
FIG. 2 is flowchart of an exemplary computerized process depicting a customer's interaction with the Outpay system upon arriving at a venue, consistent with the disclosed embodiments.

FIG. 2 depicts a customer's 251 interaction with the Outpay system upon arriving at a venue. The customer 251 may access Outpay via a web app or via the Outpay app on a customer device. If the customer uses Outpay via the web app, the customer 251 may scan the electronic check identifier to open a link in a web browser on the customer device at steps 201 and 202. Through the browser, at step 204, the customer 251 is directed to a venue-specific page with a live, venue-managed menu to open a check. The customer 251 is prompted to login or create an account at step 205. Upon entering login credentials, Outpay authenticates the login credentials, at step 206, and creates a customer account associated with the login credentials in the case of a new account or fetches a customer account previously created and stored in an Outpay database in the case of an existing account at steps 207 and 208. If the customer 251 is new and/or does not have a valid payment method associated with an Outpay account, the customer 251 is prompted to add a payment method at step 209, which may be a digital wallet associated with the customer's device, which may include, by way of non-limiting example, Apple Pay, Google Pay, or Samsung Pay. If the payment method is a digital wallet, Outpay may send a request for payment information at step 210, such as credit card information, from the digital wallet. In some embodiments, Outpay allows a customer to manually enter payment information at step 211, such as credit card information of payment via a mobile payment service such as Venmo or PayPal. Payment information is stored in the Outpay database at step 212 and associated with the customer's account.

In some embodiments, the customer device may include authenticating features, as in step 213, to ensure device security and verify the identity of the customer. For example, the customer device may include a fingerprint sensor, facial recognition camera, other biometric sensors, and/or a pin, passcode, or password created by the customer 251. In some embodiments, the authenticating features are used to both authenticate the login credentials of a customer 251 using Outpay and to grant access to a digital wallet associated with the customer 251.

In the described embodiments, a customer 251 does not need to physically interact with a terminal at a venue or hand a venue staff member 151 their payment card. Instead, using the electronic check identifier and the Outpay app or web app enables the customer 251 to associate a payment method with a check without any physical exchange, resulting in a contactless transaction.

Figure 3:
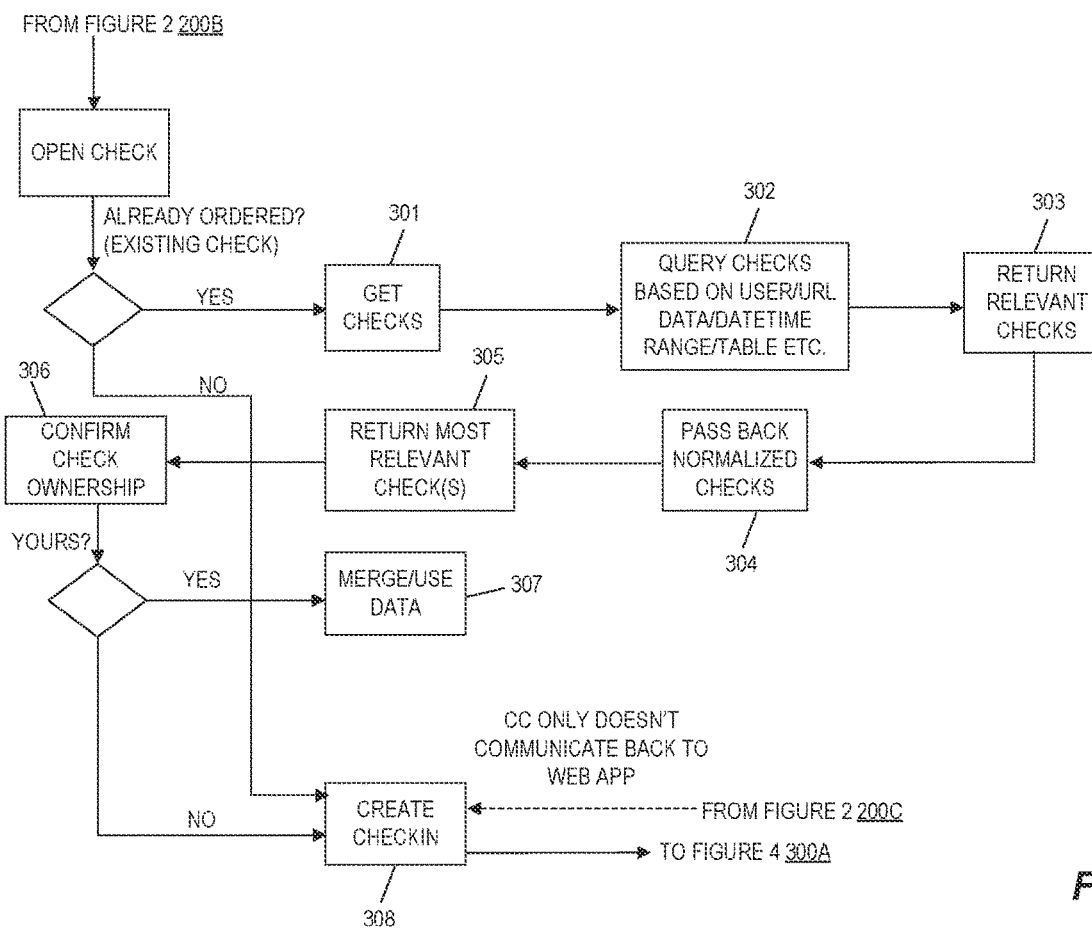
FIG. 3 is flowchart of an exemplary computerized process for opening a check using Outpay, consistent with the disclosed embodiments.

FIG. 3 shows a process of opening a check using Outpay. If payment information is entered into Outpay manually (from, e.g., step 211), a check associated with the payment information is opened. If an existing check already exists in a different system, such as a check opened by a POS system, Outpay obtains one or more pre-existing checks at step 301 by querying open checks for check data associated with the customer at step 302. By way of example, Outpay may query for check data such as the customer identification data, URL data, date data, time data, and/or table information. Based on the query, relevant checks are returned at step 303, normalized checks are passed back at step 304, and the most relevant checks are returned to Outpay at step 305. As used herein, normalizing data refers to converting data from various sources into a standardized format. Outpay may then confirm with the customer 251 at step 306 whether the most relevant checks returned are in fact associated with the customer. If the customer confirms association with the check, Outpay merges the pre-existing check data with native check data at step 307 and creates a check-in at step 308. In cases where the customer indicates that the most relevant check does not belong to them or a pre-existing check does not exist, Outpay creates a check-in at step 308.

In some embodiments, this check-in may mark a point where each customer 251 is associated with a check (e.g., a bar tab) regardless of whether the customer 251 is using an Outpay app on their respective device or provided payment data for entry by an Outpay app at the venue. Each check may be configured to take advantage of the features disclosed herein, including but not limited to adjustable preauthorization, automatic closure of checks, and/or contactless payment.

Figure 4:
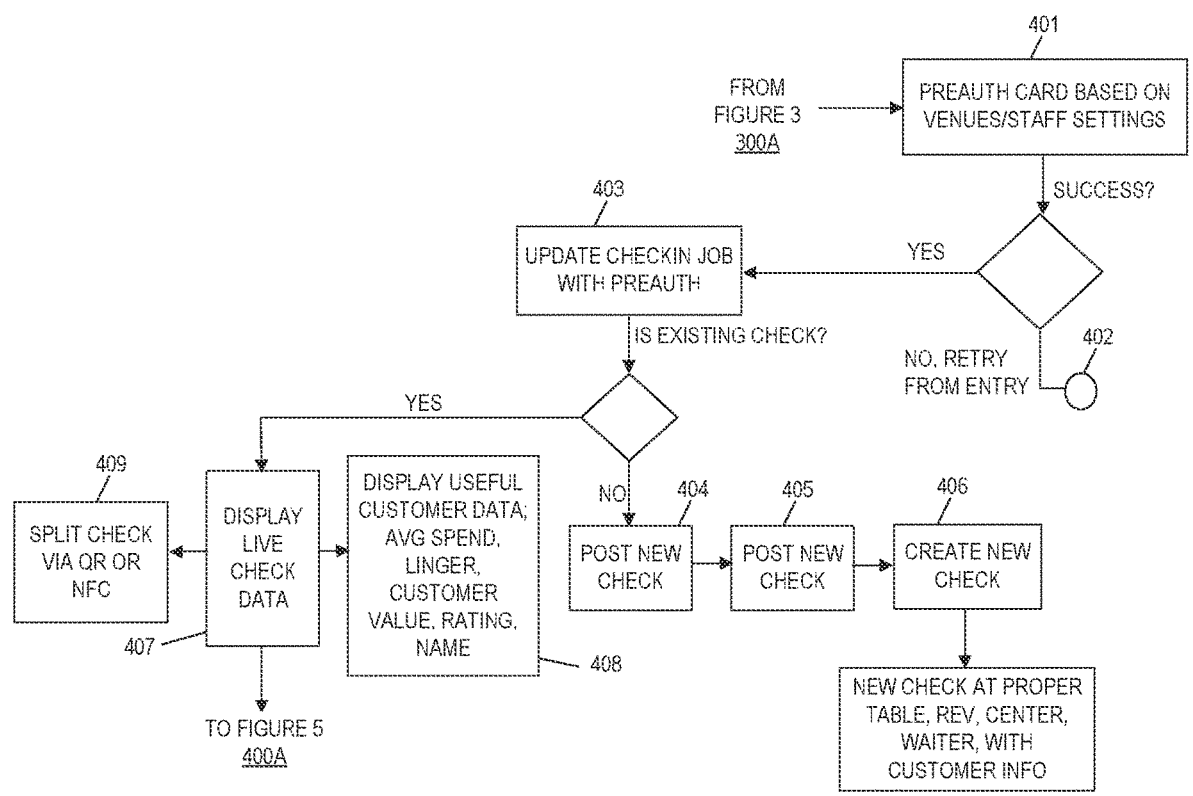
FIG. 4 is flowchart of an exemplary computerized process for updating a check-in with a preauthorized payment, consistent with the disclosed embodiments.

FIG. 4 shows a method for updating a check-in with a preauthorized payment. After a check-in is created in FIG. 3, Outpay requests a preauthorized payment at step 401 using the payment information stored and associated with the customer. If the preauthorization is not successful, the customer is redirected at step 402 to enter new payment information in a process similar to one described with respect to FIG. 2. If the preauthorization is successful, the check-in is updated at step 403 with the preauthorization status and preauthorized payment amount. Outpay then determines whether the check-in is associated with a preexisting check. If not, a new check is posted in the Outpay API 152 at step 404 and Outpay POS service at step 405, then created in the POS server at step 406 using relevant venue information and customer information. The check and relevant check information is then displayed and updated at step 407 as information is received or modified in order to provide the customer and venue with live check information. Live check information may also be displayed at step 407 in the case that Outpay determines a pre-existing check is already stored after the check-in is updated with the preauthorized payment information. In some embodiments, system may display useful customer data to venue staff at step 408, such as average spend, linger time, customer value, rating, name, or the like that can inform venue staff 151 of information useful for catering to the customer 251's habit, frequent needs, or hostile behaviors that the venue staff 151 should be aware of. In further embodiments, the check information may be used to divide a check between two or more customers at step 409 by providing a new electronic check identifier representing a portion of the original check.

Figure 5:
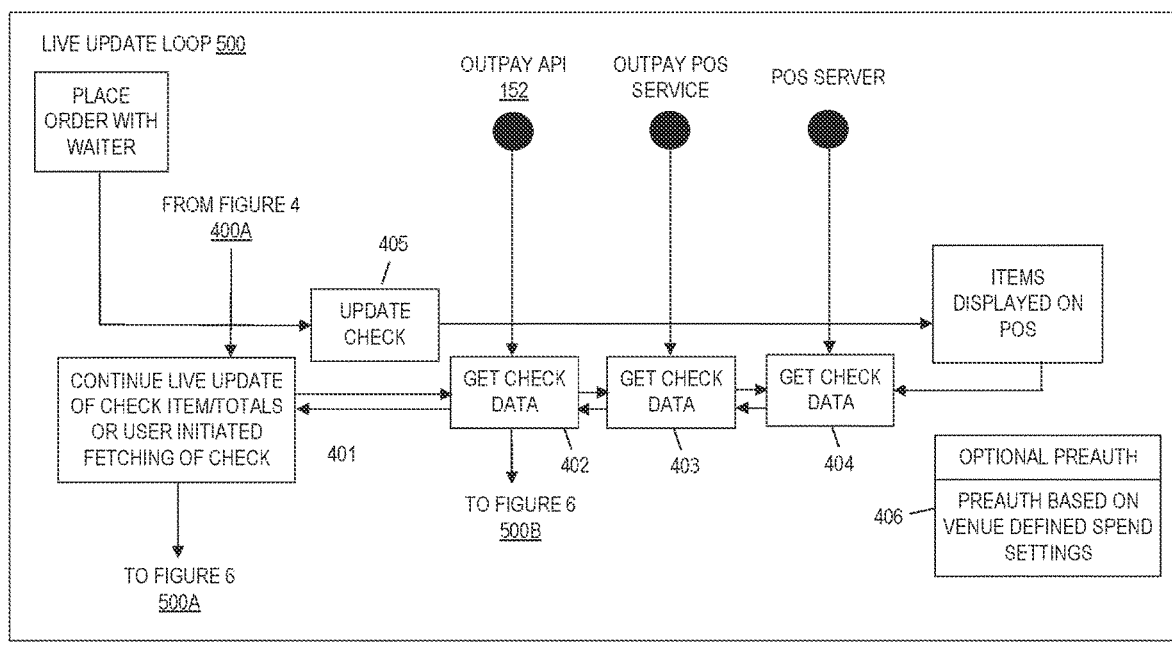
FIG. 5 is flowchart of an exemplary computerized process for ensuring check information is updated and deliverable to a customer or the venue on demand, consistent with the disclosed embodiments.

FIG. 5 shows a live update loop 500 for ensuring check information is updated and deliverable to a customer 251 or the venue on demand. In some embodiments, the live update loop 500 may be performed on a predetermined time interval to ensure consistent and frequent updating of check information at step 401. In some embodiments, the live update loop 500 may be performed based on logic and analysis of customer information, venue information, or historical data logs. For example, the update loop may be performed until a predetermined period of time elapses without a new order being placed by the customer, or until a predetermined period of time elapses since arrival of the customer at the venue or creation of a new check. In some embodiments a user, such as the customer 251 or venue staff 151, may manually initiate an update or set the parameters for the update loop.

Updated check data is received by the POS server and shared among the Outpay API 152, Outpay POS service, and POS server at steps 402, 403, and 404, respectively. Once received by the Outpay API, updated check data is sent to the Outpay web app for display to the customer. New information for updating the check, such as an order placed by the customer at step 405, is entered by venue staff 151 to the POS system before being sent into the update loop by being transmitted to the POS server.

In some embodiments, the live update loop may also include updates to the customer's preauthorized payment at step 406. For example, when the check exceeds a preauthorized payment amount, the live update loop may comprise preauthorizing an additional payment amount. In this manner, Outpay reduces the risk of customers being unable to pay a check, inadvertently leaving a venue without fully paying, or purposefully leaving a venue without paying.

Figure 6:
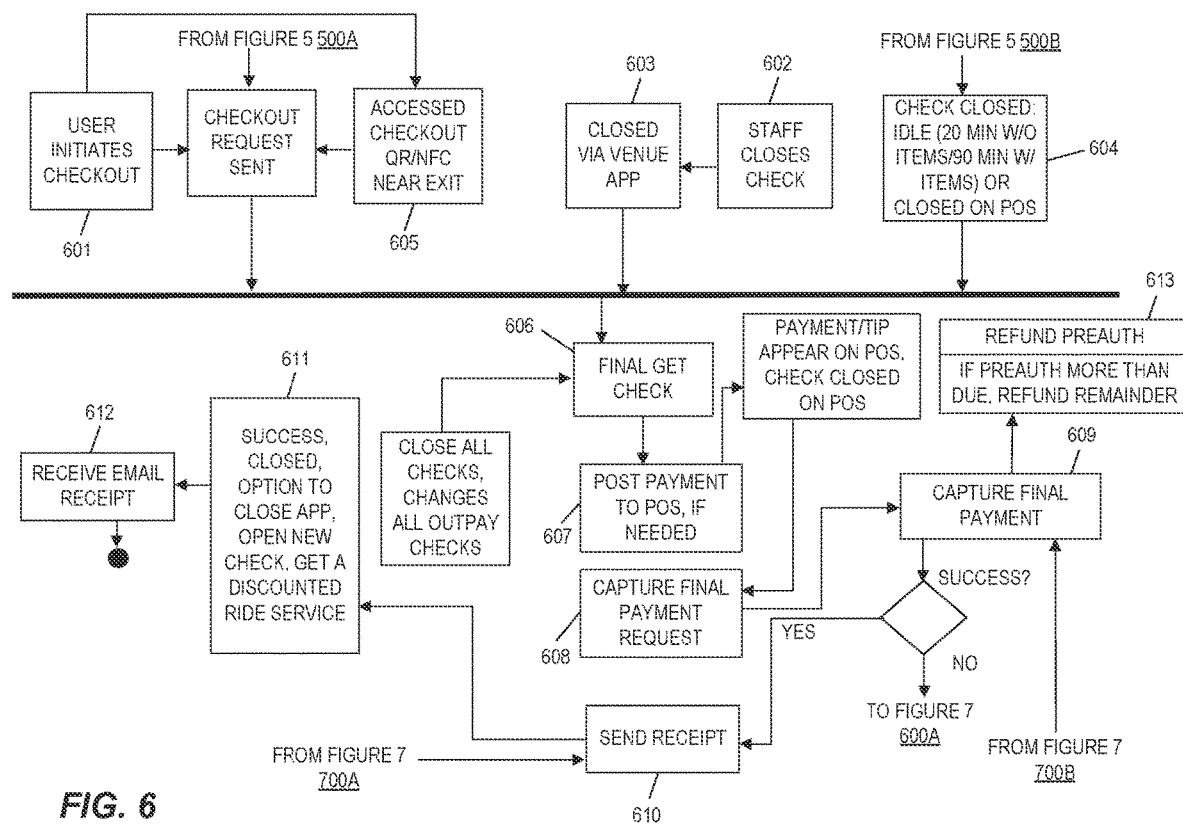
FIG. 6 is flowchart of an exemplary computerized process for initiating a checkout using Outpay, consistent with the disclosed embodiments.

FIG. 6 shows a method for initiating a checkout using Outpay. In some embodiments, a checkout request may be sent manually by a customer 251 at step 601 or venue staff 151 at steps 602 and 603, or automatically by the Outpay web app at step 604 based on expiration of a predetermined time period or update logic as described above with regard to FIG. 5. For example, the Outpay web app may send the checkout request automatically when it has not been able to connect to a customer's device via a Bluetooth beacon for a predetermined time period. In some embodiments, a checkout may be initiated at step 605 by a customer 251 accessing an electronic checkout identifier (e.g., QR code, NFC, or Bluetooth beacon) located near the exit of the venue.

Once a checkout is initiated, a final command to obtain check data is processed by the Outpay API, Outpay POS service, and POS server at step 606. If necessary, payments are posted to the Outpay POS and POS service at step 607, and payment information is transmitted to a POS server. A final payment request is captured by the Outpay API 152 at step 608 and sent to a payment processor at step 609. If the payment processor determines that payment was successful, a receipt may be sent to the customer 251 at step 610. Upon successful closing of a check at step 611, the Outpay web app may provide a customer with several options, such as the option to log out and/or close the web app, or request and/or redeem a discounted ride sharing service or a taxi. In some embodiments, a receipt may be sent via email to the customer 251 at step 612. If the payment processor determines that the final payment amount is less than the sum of preauthorized payment amounts charged to the customer, the difference may be refunded to the customer 251 at step 613.

Turning back to step 605, a check may be closed via a passive wireless link presented, for example a URL communicated via QR code or NFC, at an exit of the venue. The customer 251 may interact with the passive wireless link, which signals to the Outpay system that the customer's check should be closed. The customer may be identified via user information stored on the customer's device or within information associated with the customer 251 on the customer's Outpay app installed on the customer's device.

In some embodiments, Outpay may recognize that a customer 251 opened a check on Outpay but the venue attempted to close a check via a POS service, or that venue staff opened a check via a POS service and the customer wishes to close the check on Outpay. For example, Outpay may be integrated with or import data from the POS service and recognize that a payment method associated with an Outpay user was billed on the POS service. In either circumstance, Outpay may remove the POS service payment and bill the customer via Outpay.

Figure 7:
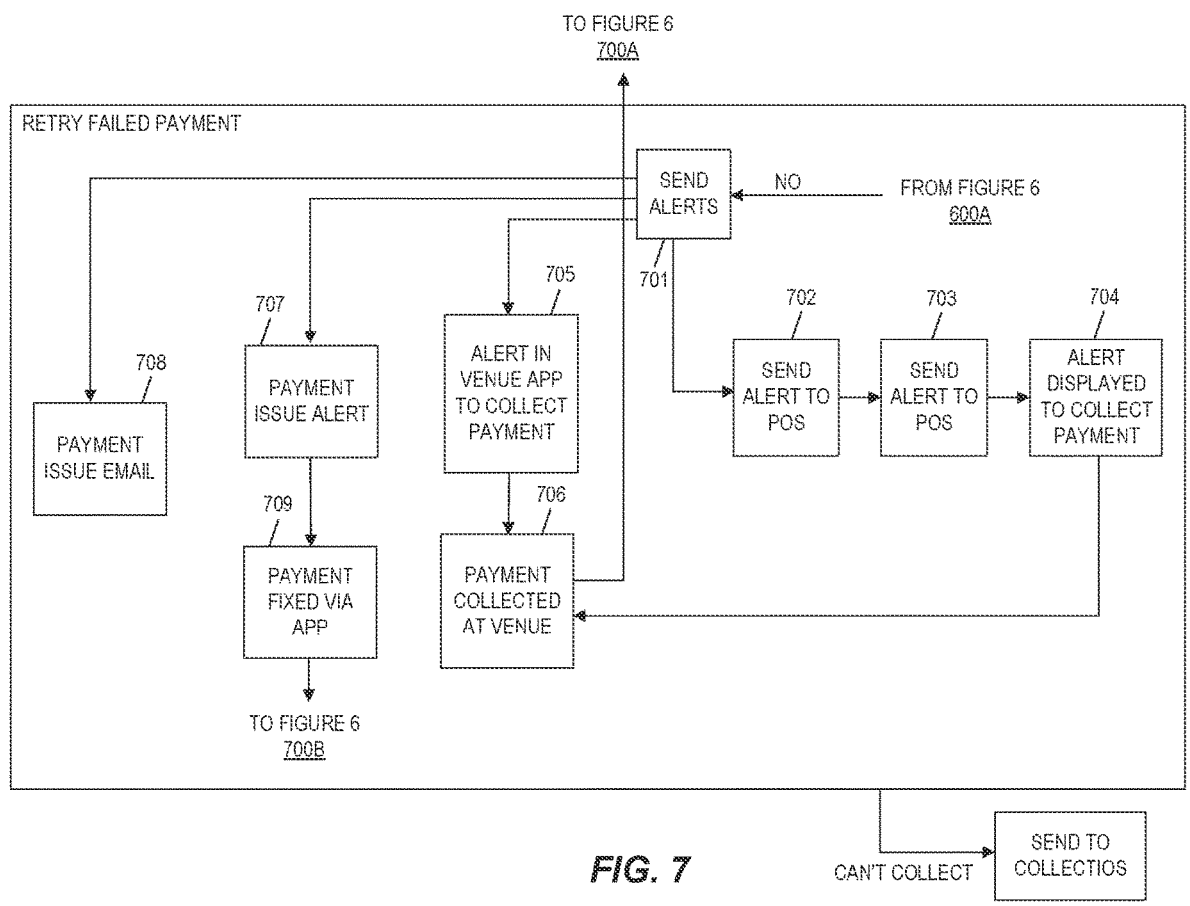
FIG. 7 is flowchart of an exemplary computerized process for sending alerts based on insufficient preauthorized payment to pay a check, consistent with the disclosed embodiments.

FIG. 7 shows a method of sending alerts based on insufficient preauthorized payment to pay a check. In some embodiments, the process shown in FIG. 7 may be repeated a predetermined number of times or automatically repeated until a payment is successfully received. If the payment processor of FIG. 6 determines that the final payment cannot be captured by the preauthorized payment, an alert is sent to the Outpay API 152 at step 701. The Outpay API 152 sends the alert to the Outpay POS service at step 702, which in turn forwards the alert to the POS server at step 703. The alert is sent to a physical POS interface at step 704 to alert venue staff 151 of the unpaid check and/or display instructions for collecting payment. The Outpay API 152 may also send the alert to the venue's Outpay device at step 705 to instruct venue staff 151 that payment needs to be collected. Upon successful collection of payment at step 706, the Outpay device sends a payment status to the Outpay API 152, which may send a receipt to the customer as shown in FIG. 6. The Outpay API 152 may also forward the insufficient payment alert to the customer 251 via the Outpay web app or customer device app at step 707, and/or email at step 708 and may instruct the customer as to how payment may be made. For example, the Outpay web app may display an insufficient payment alert informing the customer of the payment issue and providing new means for manually entering payment a new method of payment or retrying forms of payment already associated with the customer. If the customer resolves the payment issue via the Outpay web app or customer device app at step 709, the customer may receive a receipt as shown after successful capture of final payment in FIG. 6. If the customer uses the Outpay app on their device, alerts may be sent to the customer via push notification and/or in connection with an alert sound or vibration to ensure the customer is alerted of the payment issue. In some cases, resolution does not involve additional payment by the customer, but rather resolving an error in the customer's check. Thus, Outpay reduces the risk that payments will be disputed after they are made.

If the payment issue is not resolved within a predetermined period of time by the customer 251 and/or venue staff 151, Outpay may automatically make the remaining payment using one or more payment methods and payment information associated with the customer 251. If the payment issue cannot be resolved and automatic payment fails, the unpaid amount may be paid to the venue from Outpay funds and the check may be stored within Outpay for dispute resolution. The Outpay system or an external Outpay service may then resolve the dispute with the customer 251. In this manner, Outpay may eliminate the need for a venue to collect unpaid checks or resolve disputes between it and its customers. This allows the venue to receive payment more quickly and prevents situations in which an angry or inebriated customer makes dispute resolution at the time or location of sale undesirable. In addition, the method described enables Outpay to act as an insurer against disputed charges. In some embodiments customer information and/or other venue data may be used to automate dispute resolution. For example, the customer's biometric data, and contact information may be used in connection with a signature, photograph, or other data collected by the venue to facilitate automatic dispute resolution.

In cases where a check remains unpaid by the customer 251, Outpay may take additional measures to remind and/or persuade the customer 251 to make payment. For example, the customer 251 may be unable to open new checks using Outpay until unpaid amounts are paid using new and/or corrected payment information. In some embodiments Outpay may associate a non-payment identifier with the customer 251, which may be used to send a warning notification to venue staff 151 via the venue Outpay device that the customer 251 has unpaid checks. In some embodiments the non-payment identifier may be used to create a list of customers which are at higher risk of not making full payment or should not be serviced using Outpay.

Figure 8:
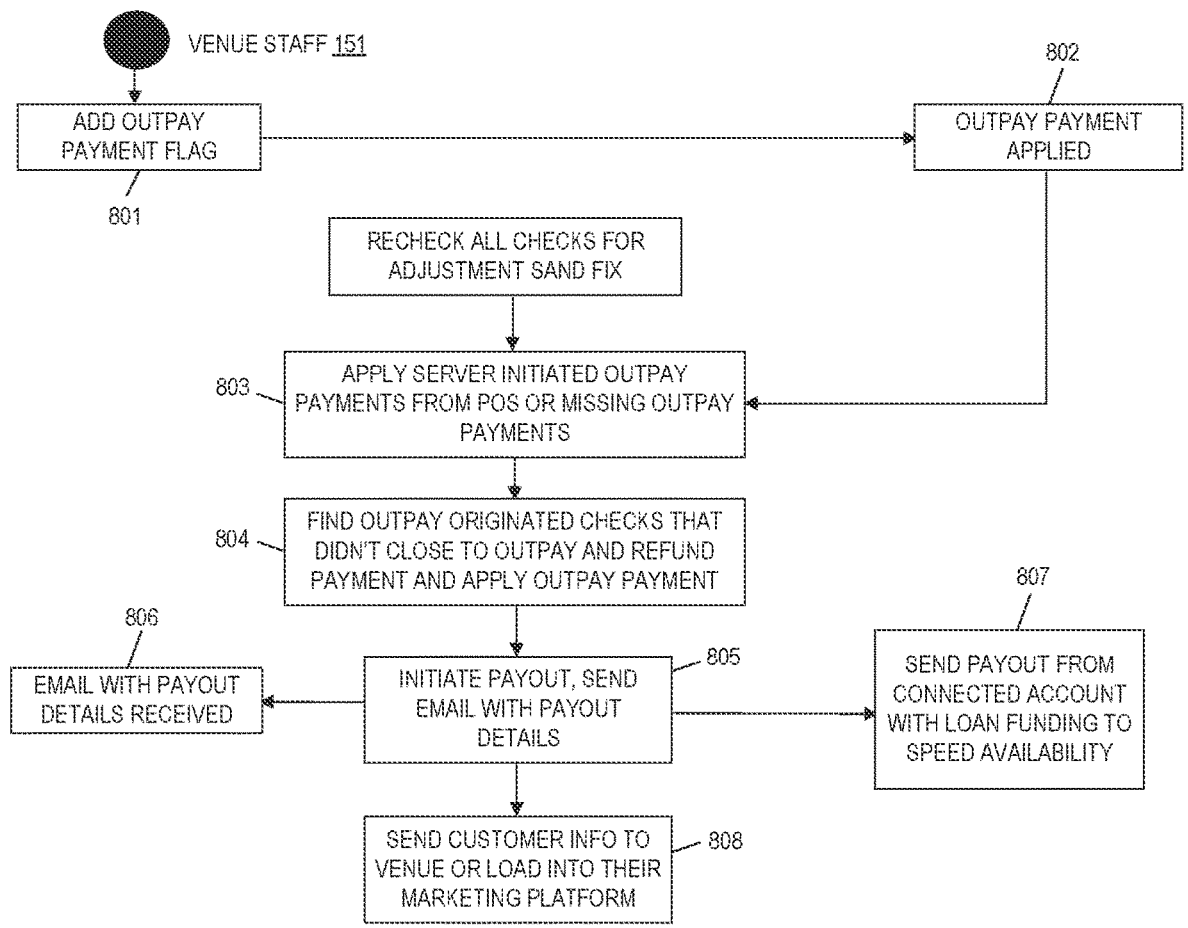
FIG. 8 is flowchart of an exemplary computerized process for end of day procedures, consistent with the disclosed embodiments.

FIG. 8 shows end of day procedures which may be implemented by Outpay. At step 801, venue staff 151 may flag payments made via Outpay, which causes Outpay payment to be applied using the venue's POS interface at step 802. The Outpay API 152 may analyze all checks processed throughout the day by the venue and make adjustments where necessary. The Outpay API 152 further applies staff-initiated Outpay payments and/or missing Outpay payments at step 803, finds checks that originated from Outpay that did not successfully close and refunds the customer or makes payments to the venue as necessary at step 804. The Outpay API 152 initiates payouts and sends emails to the venue and/or customer 251 depending on the necessary adjustments at steps 805 and 806. Payments from Outpay to the venue are made through a connected account at step 807, so that the venue receives speedy payment. This presents an advantage for venues that typically wait a period of several days for customer payments made via credit card to be processed and transferred to the venue's account. The end of day procedures may also comprise sending and/or analyzing aggregated customer information to the venue at step 808 to facilitate venue marketing or business decisions.

In some embodiments, customer information may be used to present venue staff 151 with live data. By way of non-limiting example, a customer's previous orders, visit frequency, table preference, food or drink preference, price tolerance, average spend, and/or average tip may be presented to venue staff 151. Such data may enable venue staff to present the customer with more appealing menu and/or service options, facilitate more accurate predictions for venue space availability, and facilitate the venue's ability to compare supply with demand before shortages occur.

The Outpay system may be integrated into a wide variety of venue types. For example, in some embodiments the Outpay app installed on a customer's smartphone may also be used in connection with a vehicle app such as Apple CarPlay and/or Android Auto. The customer 251 may then access one or more Outpay functions or processes described above via their vehicle's infotainment system. This may enable a customer 251 to open a check from the comfort of their car if the venue offers a curbside pickup or drive-through service. In some embodiments, Outpay may recognize that a customer 251 has entered their vehicle because of its association with the vehicle app, and may close a check opened by the customer 251 previous to entering the car. In this manner, Outpay can facilitate automatic and contactless closing of a check and billing at great convenience to the user. In some embodiments, Outpay may integrate with one or more vehicle features either through direct communication with the vehicle, wireless communication to a cloud-based vehicle control system, or communication with one or more vehicle apps stored on the same smartphone. Outpay may thus increase convenience or safety to the customer 251 based on the contents of a recent check. For example, Outpay may restrict the customer's ability to enter or operate a vehicle if a recent check indicates the customer 251 has consumed more than a predetermined amount of alcoholic menu items.

Outpay may also be configured to integrate with and or operate in connection with other venue app or services, including POS services. For example, is Outpay is used on a customer device or venue device that also has another app or POS service installed, Outpay may extract data to facilitate check creation, processing, and/or closing. In some embodiments, Outpay may include a screen capture, optical character recognition, or image recognition API to allow Outpay to extract customer data or check data from another app and/or service. In instances where a POS service is installed on a separate device, Outpay may also import data using a saved image or a live image obtained from a camera. In some embodiments, Outpay may create a wireless link such as QR code or NFC link after importing data that may be presented to a customer 251. The wireless link may then be used by the customer 251 to access the Outpay app installed on the customer's device or the Outpay web app. By importing data from other apps or services, Outpay may increase the speed and efficiency in which existing checks may be converted to Outpay. Venues which would otherwise be unable to use a new check management or POS system, whether due to cost constraints, contracts with previous app or POS service providers, or incompatibility with existing interfaces, may still use Outpay. Furthermore, the above features allow venue staff to bypass login and/or account creation processes within Outpay to create, process, and/or close checks. For example, if sufficient customer and check information is contained within the imported data, then an account may be automatically created without the need for venue staff to initiate an account creation process or for a customer 251 to manually input customer information for an initial account creation process. In circumstances where the customer 251 already has an Outpay account, imported data may contain customer information, such as the customer's name and/or payment information, sufficient to identify the customer and forego a login requirement prior to billing.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for contactless payment comprising:
   at least one processor; and
   at least one memory storing instructions that, when executed by the at least one processor, cause the system to perform operations comprising:
   receiving user information from a user device, the user information including at least authentication information and payment information;
   receiving check information from a venue, the check information including at least a check identifier and initial order information;
   generating a wireless check identifier configured for wirelessly communicating the check information to the user device using one or more of a Quick Response (QR) code, Near-Field Communication (NFC), Radio-Frequency Identification (RFID), Bluetooth, Bluetooth Low Energy (LE), or Wi-Fi;
   displaying the wireless check identifier on a display on the user device;
   displaying the check information on the display on the user device, wherein the check information is periodically updated;
   receiving a check close command; and
   requesting a payment from a user based on the user information and the check information,
   wherein the check close command is received in response to either:
   an interaction between the user device and a wireless link located near an exit of the venue; or
   a connection between the user device and a wireless device located outside of the venue.

2. The system of claim 1, wherein the operations further comprise:
   receiving the check information from the user device, wherein the check information further includes a predetermined preauthorization amount.

3. The system of claim 1, wherein the operations further comprise:
   receiving a confirmation of ownership from the user device in response to displaying the wireless check identifier, and, based on the confirmation of ownership, associating the check information with the user information.

4. The system of claim 1, wherein the operations further comprise:
   receiving additional order information from the user device, wherein the additional order information is combined with the initial order information; and
   transmitting the additional order information to the venue for processing.

5. The system of claim 4, wherein the operations further comprise:
   generating a preauthorization request using the payment information when a total amount from the additional order information and the initial order information exceeds a predetermined preauthorization amount.

6. The system of claim 1, wherein the operations further comprise:
generating a preauthorization request using the payment information based on predetermined settings associated with the venue.

7. The system of claim 6, wherein the operations further comprise:
requesting new payment information if the preauthorization request is not successful.

8. The system of claim 1, wherein receiving the check close command is triggered by a predetermined period of inactivity by the user.

9. The system of claim 1, wherein the check close command is received from the venue.

10. The system of claim 1, wherein the check close command is received from the user device via wireless communication.

11. The system of claim 1, wherein the operations further comprise:
receiving updates from the user device in response to requesting the payment.

12. The system of claim 1, wherein requesting the payment from the user comprises:
splitting the payment among a plurality of users.

13. The system of claim 1, wherein requesting the payment from the user comprises transmitting a charge request to a payment account associated with payment information gathered from the user device.

14. The system of claim 1, wherein requesting the payment from the user comprises:
repeatedly transmitting a charge request to a payment account associated with payment information.

15. The system of claim 1, wherein the operations further comprise:
providing, to the venue, customer profile information comprising one or more of: average spend, linger time, preferences, or habit.

16. A system for express payment triggered by customer activity, the system comprising:
at least one processor; and
at least one memory storing instructions that, when executed by the at least one processor, cause the system to perform operations comprising:
providing a wireless link comprising QR code or NFC or connections to one or more Bluetooth beacons upon arrival at a venue;
receiving payment information from a customer via the QR code or NFC or connections to one or more Bluetooth beacons;
generating customer context data about the customer;
obtaining a preauthorization request for a spending allowance determined based on the customer context data;
generating a check data with the spending allowance;
updating the check data based on the customer's activity at the venue;
detecting an exit trigger from an entrance beacon configured to receive a current location of a customer device; and
finalizing the updated check data by using the detected exit trigger,
wherein the exit trigger is generated when the entrance beacon fails to receive the current location of the customer device for a predetermined amount of time.

17. The system of claim 16, wherein receiving the payment information comprises at least one of:
detecting arrival of the customer using an entrance beacon configured to generate an entrance trigger based on presence of a customer device within a predetermined boundary; or
registering a payment method from the customer at an entrance of the venue.

18. The system of claim 16, wherein generating the customer context data comprises at least one of:
accessing an account profile associated with the customer and receiving transaction history of the customer; or
receiving a user profile via a customer device, wherein the customer device is associated with the user profile linked to an online service.

19. The system of claim 16, wherein the operations further comprise:
determining the spending allowance based on a combination of at least two of: the customer context data, time of day, and a venue profile of the venue.

20. The system of claim 16, wherein the spending allowance is variable based on factors comprising: wealth, spending habit, or the activity of the customer.

21. The system of claim 16, wherein finalizing the check data further comprises at least one of:
receiving an encrypted key from the customer upon departure of the customer from the venue; or
detecting the departure of the customer using an entrance beacon configured to generate an exit trigger based on absence of the customer device within a predetermined boundary.

22. The system of claim 16, wherein finalizing the check data occurs upon departure of the customer from the venue.

* * * * *